(12) United States Patent
Okamoto et al.

(10) Patent No.: US 11,311,833 B2
(45) Date of Patent: *Apr. 26, 2022

(54) METHOD AND SYSTEM FOR RECOVERING ACIDIC GAS

(71) Applicant: Mitsubishi Heavy Industries Engineering, Ltd., Kanagawa (JP)

(72) Inventors: Shinichi Okamoto, Tokyo (JP); Shinji Nakamura, Tokyo (JP); Takuya Hirata, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 134 days.

This patent is subject to a terminal disclaimer.

(21) Appl. No.: 16/635,360

(22) PCT Filed: Oct. 16, 2018

(86) PCT No.: PCT/JP2018/038419
§ 371 (c)(1),
(2) Date: Jan. 30, 2020

(87) PCT Pub. No.: WO2019/087762
PCT Pub. Date: May 9, 2019

(65) Prior Publication Data
US 2020/0155996 A1 May 21, 2020

(30) Foreign Application Priority Data
Oct. 31, 2017 (JP) .............................. JP2017-210487

(51) Int. Cl.
*B01D 53/14* (2006.01)
*B01J 49/50* (2017.01)
(Continued)

(52) U.S. Cl.
CPC ....... *B01D 53/1418* (2013.01); *B01D 15/203* (2013.01); *B01D 15/3828* (2013.01);
(Continued)

(58) Field of Classification Search
None
See application file for complete search history.

(56) References Cited

U.S. PATENT DOCUMENTS

| 4,477,419 A | 10/1984 | Pearce et al. |
| 2014/0252700 A1 | 9/2014 | Sakaguchi et al. |
| 2015/0306538 A1 | 10/2015 | Hoff et al. |

FOREIGN PATENT DOCUMENTS

| EP | 3369472 A1 | 9/2018 |
| JP | S59-169920 A | 9/1984 |

(Continued)

OTHER PUBLICATIONS

JP2014-185913A English Translation from Espacenet (Year: 2021).*
JP2009-288021A English Translation from Espacenet (Year: 2021).*
International Search Report in corresponding International Application No. PCT/JP2018/038419, dated Dec. 25, 2018 (4 pages).

*Primary Examiner* — Philip Y Louie
(74) *Attorney, Agent, or Firm* — Osha Bergman Watanabe & Burton LLP (57) ABSTRACT

A method for recovering an acidic gas, includes: a step of bringing a gas to be treated that contains an acidic gas into gas-liquid into contact with an amine absorbing solution, allowing the amine absorbing solution to absorb the acidic gas, thereby removing the acidic gas from the gas to be treated; a step of allowing the amine absorbing solution that has absorbed the acidic gas to release the acidic gas, thereby regenerating the amine absorbing solution, and at the same time, recovering the released acidic gas; and an analysis step of calculating concentrations of iron ions and/or heavy metal ions in the amine absorbing solution.

12 Claims, 4 Drawing Sheets

(51) Int. Cl.
*B01J 45/00* (2006.01)
*B01D 15/20* (2006.01)
*B01J 47/014* (2017.01)
*B01D 15/38* (2006.01)
*B01D 53/18* (2006.01)
*G01N 1/20* (2006.01)
*G01N 1/10* (2006.01)

(52) U.S. Cl.
CPC ..... *B01D 53/1425* (2013.01); *B01D 53/1475* (2013.01); *B01D 53/18* (2013.01); *B01J 45/00* (2013.01); *B01J 47/014* (2017.01); *B01J 49/50* (2017.01); *G01N 1/20* (2013.01); *B01D 2252/204* (2013.01); *G01N 2001/1006* (2013.01)

(56) References Cited

FOREIGN PATENT DOCUMENTS

| | | | |
|---|---|---|---|
| JP | H05-277342 A | | 10/1993 |
| JP | H07-233489 A | | 9/1995 |
| JP | 2009288021 A | * | 12/2009 |
| JP | 2011-168539 A | | 9/2011 |
| JP | 2012-086216 A | | 5/2012 |
| JP | 2012-236170 A | | 12/2012 |
| JP | 2013-108108 A | | 6/2013 |
| JP | 2014185913 A | * | 10/2014 |
| JP | 2016-507355 A | | 3/2016 |
| JP | 2017-080670 A | | 5/2017 |
| WO | WO-2014086988 A1 | * | 6/2014 ......... B01D 53/1475 |

* cited by examiner

METHOD AND SYSTEM FOR RECOVERING ACIDIC GAS

TECHNICAL FIELD

The present invention relates to a method and a system for recovering an acidic gas. This application claims the benefit of priority based on Japanese Patent Application No. 2017-210487 filed on Oct. 31, 2017, the entire contents of which are incorporated herein by reference.

BACKGROUND ART

In recent years, various methods have been proposed for removing and recovering acidic gases such as carbon dioxide ($CO_2$) and hydrogen sulfide ($H_2S$) which are contained in a combustion exhaust gas of a fossil fuel and the like. As such a method, there is a method of removing and recovering an acidic gas from a combustion exhaust gas by bringing the combustion exhaust gas into contact with an amine absorbing solution such as an aqueous alkanolamine solution.

Such an amine absorbing solution causes corrosion of equipment materials, causing deterioration, and thus, a method is known (Patent Document 1) in which a corrosion inhibitor is added to the amine absorbing solution, and at the same time, measuring a potential difference of the amine absorbing solution, when this potential difference has reached a predetermined range, blow oxygen into the amine absorbing solution, and thereby maintain the concentration of the corrosion inhibitor at a predetermined concentration.

REFERENCE DOCUMENT LIST

Patent Document

Patent Document 1: Japanese Unexamined Patent Application Publication No. 7-233489

SUMMARY OF THE INVENTION

In the above-described example, the amine absorbing solution repeatedly absorbs and releases the acidic gas, and is recycled; and an amine compound in the amine absorbing solution is oxidized and deteriorated. Along with the formation of such oxidative degradation products, the corrosivity of the amine absorbing solution to iron-based equipment materials increases, and metal ions such as iron ions and heavy metal ions are eluted into the amine absorbing solution. In particular, iron ions exhibit a catalytic effect on an oxidative degradation reaction of amine compounds, and as the ion concentration increases, the oxidative degradation products are acceleratingly formed which exhibit corrosivity on the equipment materials, and corrosion rates of the equipment materials sharply rise. Thus, it is necessary to monitor the concentrations of the metal ions such as the iron ions and the heavy metal ions in the amine absorbing solution, and to take measures for reducing the concentrations of the metal ions when the concentration has risen.

On the other hand, the amine absorbing solution contains amine compounds at a high concentration of, for example, about 20 to 70%. Thus, in order to measure the concentrations of the metal ions such as the iron ions and the heavy metal ions, it is necessary to decompose and remove the amine compounds in the amine absorbing solution. However, pretreatment such as a wet oxidative decomposition method in the JIS standard is complicated and takes a long time, and it is difficult to analyze and monitor the concentrations of the metal ions in the amine absorbing solution with high frequency. In addition, if it takes a long time to obtain the concentrations of the metal ions in the amine absorbing solution, the discovery of corrosion of the equipment material is delayed, and it becomes necessary to temporarily stop the process of removing and recovering the acidic gas in order to take measures; and there is a problem in that stable operation cannot be continued.

In the light of these circumstances, an object of the present invention is to provide a method and a system for recovering an acidic gas, which can quantify metal ions such as iron ions and heavy metal ions in an amine absorbing solution in a short time and with high accuracy, and can remove factors which increase the corrosivity of an amine absorbing solution at an early stage.

In one aspect, the present invention is a method for recovering an acidic gas. The method for recovering an acidic gas includes: a step of bringing a gas to be treated that contains an acidic gas into gas-liquid contact with an amine absorbing solution, allowing the amine absorbing solution to absorb the acidic gas, and thereby removing the acidic gas from the gas to be treated, a step of allowing the amine absorbing solution that has absorbed the acidic gas to release the acidic gas, thereby regenerating the amine absorbing solution, and at the same time, recovering the released acidic gas, and an analysis step of calculating concentrations of iron ions and/or heavy metal ions in the amine absorbing solution, wherein the analysis step includes: a step of adjusting a pH value of the collected amine absorbing solution until the iron ions and/or the heavy metal ions adsorb to a chelating resin; a step of passing the collected amine absorbing solution through the chelating resin, and thereby allowing the chelating resin to adsorb the iron ions and/or the heavy metal ions in the amine absorbing solution; a step of passing an acidic regenerating solution through the chelating resin that has adsorbed the iron ions and/or the heavy metal ions, thereby allowing the iron ions and/or the heavy metal ions to desorb, regenerating the chelating resin, and at the same time, obtaining a sample containing the iron ions and/or heavy metal ions; and a step of quantifying the iron ions and/or the heavy metal ions in the sample, and calculating the concentrations of the iron ions and/or the heavy metal ions in the collected amine absorbing solution, from the quantification results.

In one aspect of the present invention, the method for recovering the acidic gas includes quantifying the iron ions and/or the heavy metal ions in the sample by using an absorptiometric method.

In one aspect of the present invention, the method for recovering the acidic gas further includes a step of removing the iron ions and/or the heavy metal ions in the amine absorbing solution, when the calculated concentrations of the iron ions and/or the heavy metal ions in the amine absorbing solution have exceeded thresholds.

In one aspect of the present invention, the method for recovering the acidic gas further includes a step of stopping the analysis step when the calculated concentrations of the iron ions and/or the heavy metal ions in the amine absorbing solution are the thresholds or lower, and at the same time, cleaning equipment and a flow path that have been used in the analysis step.

In one aspect of the present invention, the method for recovering the acidic gas further includes a step of calibrating an apparatus that has been used for quantifying the iron ions and/or the heavy metal ions in the sample in a state of stopping the analysis step, or a step of regenerating the chelating resin that has been used in the analysis step.

In one aspect, the present invention is a system for recovering an acidic gas. The system for recovering the acidic gas includes an absorbing tower that brings a gas to be treated which contains an acidic gas into gas-liquid contact with an amine absorbing solution, allowing the amine absorbing solution to absorb the acidic gas, and thereby removing the acidic gas from the gas to be treated, a regenerating tower that allows the amine absorbing solution which has absorbed the acidic gas in the acidic gas absorbing tower to release the acidic gas, thereby regenerating the amine absorbing solution, and at the same time, recovering the released acidic gas, and an analysis apparatus that calculates concentrations of iron ions and/or heavy metal ions in the amine absorbing solution, wherein the analysis apparatus includes: a collecting unit that collects a certain amount of the amine absorbing solution; a solution adjusting unit that adjusts a pH value of the collected amine absorbing solution until the iron ions and/or the heavy metal ions adsorb to a chelating resin; an adsorbing unit that includes the chelating resin, passes the collected amine absorbing solution through the chelating resin, and thereby allows the chelating resin to adsorb the iron ions and/or the heavy metal ions in the amine absorbing solution; a desorbing unit that passes the acidic regenerating solution through the chelating resin that has adsorbed the iron ions and/or the heavy metal ions, thereby allows the iron ions and/or the heavy metal ions to desorb, regenerates the chelating resin, and at the same time, obtains the sample containing the iron ions and/or heavy metal ions; and a measuring unit that quantifies the iron ions and/or the heavy metal ions in the sample, and calculates the concentrations of the iron ions and/or the heavy metal ions in the collected amine absorbing solution, from the quantification results.

In one aspect of the present invention, in the system for recovering the acidic gas, the measuring unit includes an absorptiometer that quantifies the iron ions and/or the heavy metal ions in the sample.

In one aspect of the present invention, the system for recovering the acidic gas further includes an apparatus that removes the iron ions and/or the heavy metal ions in the amine absorbing solution when the calculated concentrations of the iron ions and/or the heavy metal ions in the amine absorbing solution have exceeded thresholds.

In one aspect of the present invention, the system for recovering the acidic gas further includes a control apparatus that cleans the equipment and a flow path of the analysis apparatus when the concentrations of the iron ions and/or the heavy metal ions in the calculated amine absorbing solution are the thresholds or lower.

In addition, in one aspect of the present invention, the control apparatus of the system for recovering the acidic gas calibrates the absorptiometer in the cleaned equipment and flow path of the analysis apparatus, or regenerates the chelating resin.

According to the present invention, the method and the system can quantify metal ions such as iron ions and heavy metal ions in an amine absorbing solution in a short time and with high accuracy, and can remove factors that increase the corrosivity of the amine absorbing solution at an early stage.

MODE FOR CARRYING OUT THE INVENTION

Embodiments of a method for recovering an acidic gas and a system for recovering the acidic gas according to the present invention will be described below in detail, with reference to the accompanying drawings. The present invention is not limited to the embodiments, which will be described below.

1. System for Recovering Acidic Gas

Figure 1:
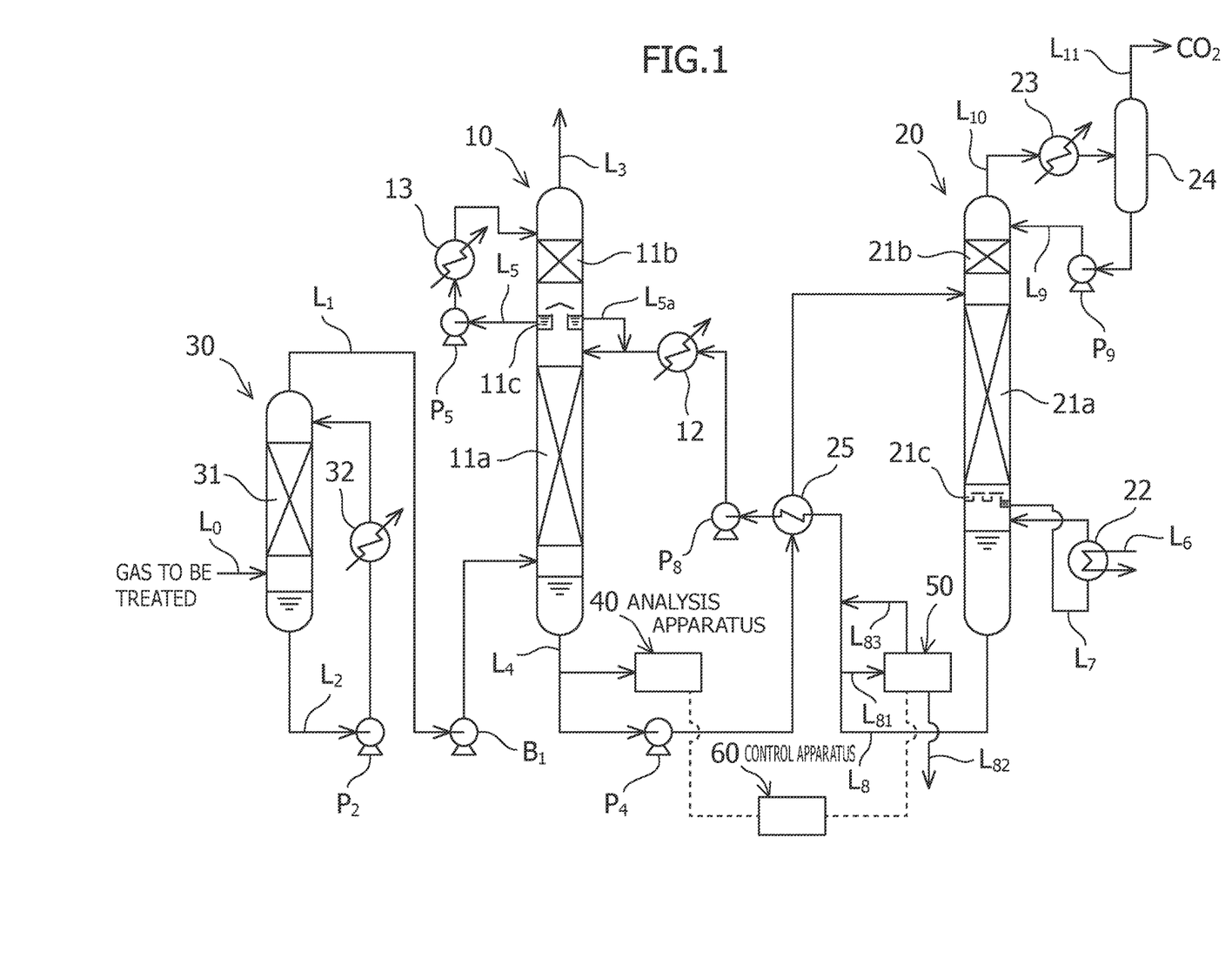
FIG. 1 shows a schematic view showing one embodiment of a system for recovering an acidic gas according to the present invention.
Figure 2:
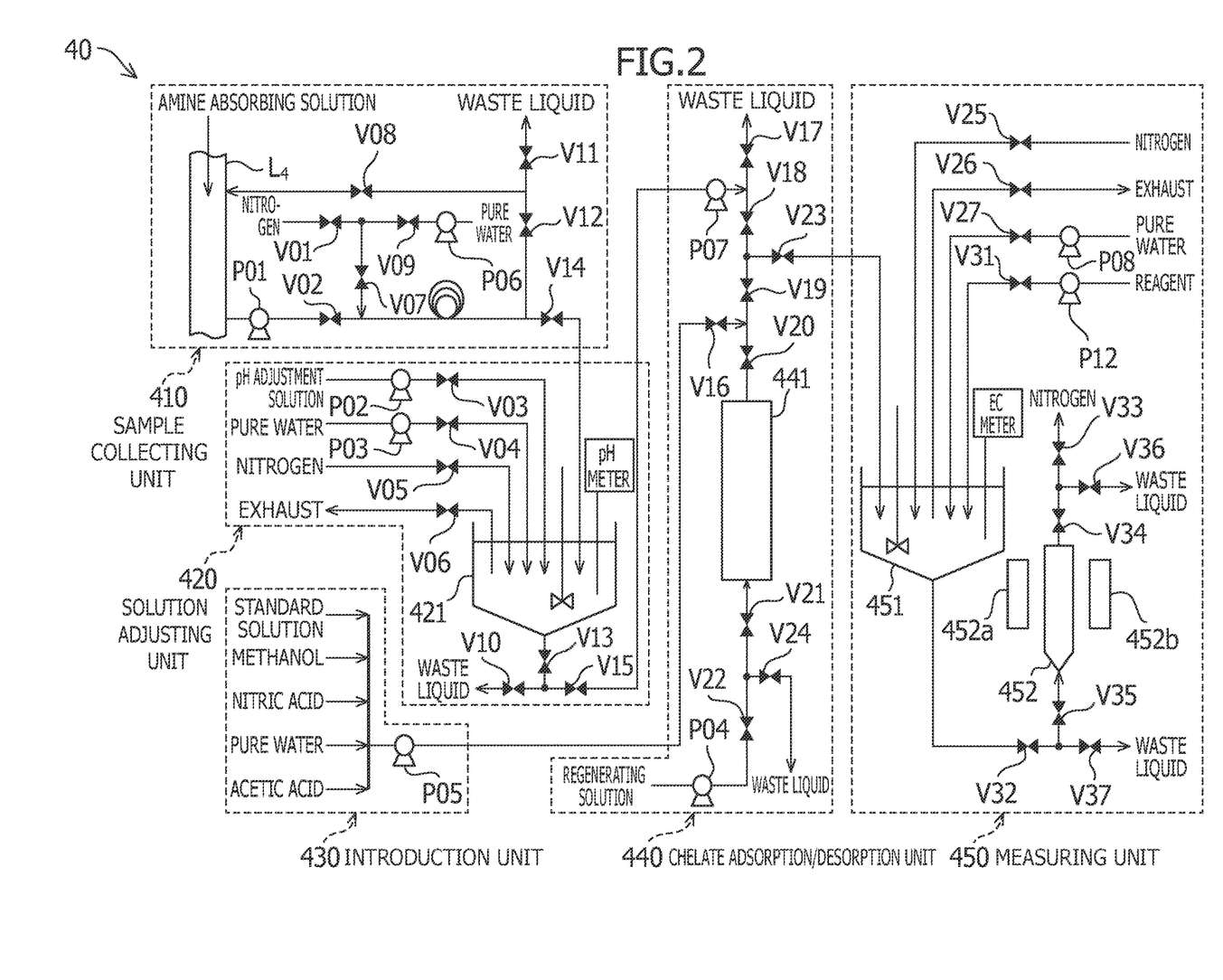
FIG. 2 shows a schematic view showing an analysis apparatus, in the system for recovering the acidic gas shown in FIG. 1.

FIG. 1 and FIG. 2 show one embodiment of the system for recovering the acidic gas according to the present invention. As is shown in FIG. 1, the system for recovering the acidic gas of the present embodiment includes an absorbing tower 10, a regenerating tower 20, a cooling tower 30, an analysis apparatus 40, and a reclaiming apparatus 50. It is typical, for the acidic gas, for either or both of carbon dioxide ($CO_2$) and hydrogen sulfide ($H_2S$) to be the object, and in the present embodiment, the case is exemplified in which the acidic gas is $CO_2$. An object of analysis for the analysis apparatus 40 is iron ions and/or heavy metal ions, but, for the sake of convenience, the iron ions will be mainly exemplified and described. In addition, FIG. 1 is a figure for describing the outline of the present embodiment, and a part of attached equipment is omitted.

The absorbing tower 10 removes $CO_2$ from the gas to be treated, by bringing the gas to be treated which contains $CO_2$ into gas-liquid contact with the amine absorbing solution, and allowing the amine absorbing solution to absorb the $CO_2$. The absorbing tower 10 includes: a flow path $L_1$ for supplying the gas to be treated which contains $CO_2$ into the absorbing tower 10, in a lower part of the tower; and a flow path $L_3$ that discharges a gas to be treated from which $CO_2$ has been removed, from the absorbing tower 10, at the top of the tower. In a space between positions at which the flow paths $L_1$ and $L_3$ are each connected, there are provided a lower packed portion 11a in which the gas to be treated and the amine absorbing solution come into gas-liquid contact with each other, and an upper packed portion 11b in which the gas to be treated after having come into contact with the amine absorbing solution comes into gas-liquid contact with a cleaning liquid.

In addition, the absorbing tower 10 includes a water receiving portion 11c between the upper packed portion 11b and the lower packed portion 11a. The water receiving portion 11c is structured so as to allow the gas to pass from below to above the absorbing tower 10, and so as not to allow a liquid to pass from above to below the absorbing tower 10. The water receiving portion 11c is provided with a flow path $L_5$ which supplies a liquid accumulated in the water receiving portion 11c into the absorbing tower 10 from above the upper packed portion 11b. In the flow path $L_5$, there are provided a pump $P_5$ which feeds the liquid, and a cooler 13 which cools the liquid. A flow path $L_4$ for sending a part of the amine absorbing solution (rich absorbing solution) that has absorbed $CO_2$ to the regenerating tower 20 is provided at the bottom of the absorbing tower 10. In the flow path $L_4$, there are provided an analysis apparatus 40, a pump $P_4$ for feeding the amine absorbing solution, and a heat exchanger 25 for exchanging heat with a lean absorbing solution which will be described later, sequentially from an absorbing tower 10 side.

The regenerating tower 20 releases $CO_2$ from the rich absorbing solution and thereby regenerates the amine absorbing solution (lean absorbing solution) which has released $CO_2$, as an absorbing solution for $CO_2$. The regenerating tower 20 includes a lower packed portion 21a for allowing the rich absorbing solution to release $CO_2$, below the position of the flow path $L_4$ to which the rich absorbing solution is supplied, and an upper packed portion 21b which cleans the released $CO_2$ gas with reflux water. In addition, the regenerating tower 20 includes an absorbing solution receiving portion 21c below the lower packed portion 21a. The absorbing solution receiving portion 21c is structured so as to allow a gas to pass from below to above the regenerating tower 20, and so as not to allow a liquid to pass from above to below the regenerating tower 20. The absorbing solution receiving portion 21c is provided with a flow path $L_7$ for supplying the rich absorbing solution accumulated in the absorbing solution receiving portion 21c, into the regenerating tower 20 from below the absorbing solution receiving portion 21c. In the flow path $L_7$, there is provided a reboiler 22 which heats the rich absorbing solution, in order to allow the rich absorbing solution to release $CO_2$. The reboiler 22 is provided with a flow path $L_6$ which supplies saturated steam for heating to the reboiler 22.

In addition, at the top of the regenerating tower 20, there is provided a flow path $L_{10}$ that discharges the $CO_2$ gas therethrough which has been released from the rich absorbing solution, from the regenerating tower 20. In the flow path $L_{10}$, there is provided a cooler 23 which cools the $CO_2$ gas, and a gas-liquid separator 24 which separates the condensed water produced by the cooling from the $CO_2$ gas. The gas-liquid separator 24 includes a flow path $L_9$ and a flow path $L_{11}$, and is structured so as to supply the separated condensed water as the reflux water to above the upper packed portion 21b in the regenerating tower 20, and so as to discharge the separated $CO_2$ gas to the outside of the system. The tower bottom of the regenerating tower 20 is provided with a flow path $L_8$ that supplies the lean absorbing solution which has been heated and regenerated by the reboiler 22, to above the lower packed portion 11a in the absorbing tower 10. In the flow path $L_8$, there are provided on the regenerating tower 20 side: the reclaiming apparatus 50; the heat exchanger 25 that exchanges heat between the reclaiming apparatus 50 and the rich absorbing solution which flows in the flow path $L_4$; a pump $P_8$ that feeds the lean absorbing solution; a cooler 12 that cools the lean absorbing solution; and a flow path $L_{5a}$ that supplies a part of the liquid accumulated in the water receiving portion 11c of the absorbing tower 10, together with the lean absorbing solution, into the absorbing tower 10.

The cooling tower 30 cools the gas to be treated before being supplied to the absorbing tower 10, in the upstream side with respect to a flow direction of the gas to be treated of the absorbing tower 10. The cooling tower 30 includes: a flow path $L_0$ for supplying the gas to be treated into the cooling tower 30, in a lower part of the tower; and a flow path $L_1$ that discharges the gas to be treated which has been cooled, from the cooling tower 30, and supplies the gas to the absorbing tower 10, at the top of the tower. In a space between positions at which the flow paths $L_0$ and $L_1$ are each connected, there is provided a packed portion 31 for bringing the gas to be treated into contact with the cooling water. In the flow path $L_1$, a blower $B_1$ is provided which feeds the gas to be treated. The tower bottom of the cooling tower 30 is provided with a flow path $L_2$ which supplies the cooling water accumulated in the tower bottom to above the packed portion 31 in the cooling tower 30. In the flow path $L_2$, a cooler 32 is provided which cools the cooling water.

The analysis apparatus 40 is arranged in an absorbing tower 10 side of the flow path $L_4$ which supplies the rich absorbing solution from the absorbing tower 10 to the regenerating tower 20. The analysis apparatus 40 is structured so as to separate an amine compound and the iron ions in the amine absorbing solution by a chelating resin, remove the amine compound and the iron ions which have bonded to the chelating resin to regenerate the chelating resin, and quantify the iron ions in the amine absorbing solution by an optical measuring device. The analysis apparatus 40 may be arranged in a regenerating tower 20 side of the flow path $L_4$, may be arranged in a regenerating tower 20 side or in an absorbing tower 10 side of the flow path $L_8$ which supplies the lean absorbing solution from the regenerating tower 20 to the absorbing tower 10, may be arranged in the absorbing tower 10, or may be arranged in the regenerating tower 20. Among the positions, it is preferable that the analysis apparatus 40 be arranged in the flow path $L_8$ of the lean absorbing solution. If the analysis apparatus 40 is arranged at this position, the analysis apparatus 40 can relatively easily measure the concentrations of the iron ions and/or the heavy metal ions in the amine absorbing solution.

The reclaiming apparatus 50 is structured so as to be capable of communicating with a control apparatus 60, which will be described later, and the operation and the stop are controlled by the control apparatus 60. The reclaiming apparatus 50 is provided with a flow path $L_{81}$ which supplies the amine absorbing solution to the reclaiming apparatus 50 from the lean absorbing solution flow path $L_8$. In addition, the reclaiming apparatus 50 is provided with a flow path $L_{82}$ that discharges a residue containing the iron ions and/or the heavy metal ions which have been removed from the amine absorbing solution, and a flow path $L_{83}$ that supplies the amine absorbing solution in which the iron ions and/or the heavy metal ions have been removed and of which the corrosivity has been thereby reduced, to the absorbing tower 10, in order that the solution is reused.

In addition, the reclaiming apparatus 50 may be structured so as to be capable of separating the iron ions and/or the heavy metal ions from the amine absorbing solution, and for example, can adopt a structure with the use of a thermal reclaiming method, an electrodialysis method, an ion exchange method or the like. In the case in which the reclaiming apparatus 50 is structured to use a thermal reclaiming method in order to separate the iron ions from the amine absorbing solution, the reclaiming apparatus 50 includes at least an unshown evaporator and an unshown cooler. The reclaiming apparatus 50 heats the amine absorbing solution to a temperature at which the amine compound in the amine absorbing solution evaporates, by the evaporator, separates the amine compound in the amine absorbing solution from iron ions and/or heavy metal ions, liquefies the evaporated amine compound by a cooler, and forms the amine absorbing solution. Thereby, the iron ions can be removed from the amine absorbing solution. In addition, the structure of the reclaiming apparatus which uses the thermal reclaiming method may have a structure in which the reclaiming apparatus does not include the cooler (not shown), the regenerating tower supplies the amine absorbing solution to the reclaiming apparatus 50 from the discharge side of the pump $P_8$ in the flow path $L_8$, and the reclaiming apparatus supplies the amine absorbing solution of which the corrosivity has been reduced, into the regenerating tower 20 from below the absorbing solution receiving portion 21c. In addition, the reclaiming apparatus 50 may be arranged in an absorbing tower 10 side of the flow path $L_8$, or may also be arranged on the absorbing tower 10 side or in a regenerating tower 20 side of the flow path $L_4$ which supplies the rich absorbing solution from the absorbing tower 10 to the regenerating tower 20. Among the positions, it is preferable to arrange the reclaiming apparatus 50 in the flow path $L_8$ of the lean absorbing solution. If the reclaiming apparatus 50 is arranged at this position, the reclaiming apparatus 50 can relatively easily remove the iron ions and/or the heavy metal ions in the amine absorbing solution.

Next, the analysis apparatus 40 will be described in more detail with reference to FIG. 2. As is shown in FIG. 2, the analysis apparatus 40 includes at least a sample collecting unit 410, a solution adjusting unit 420, an introduction unit 430, a chelate adsorption/desorption unit 440, and a measuring unit 450. In addition, FIG. 2 is a figure for describing the outline of the present embodiment, and a part of attached equipment is omitted.

The sample collecting unit 410 is a flow path which communicates with the flow path $L_4$ and the solution adjusting unit 420; and includes, in the flow path, on-off valves V01, V02, V07 to V09, V11, V12 and V14, pumps P01 and P06, and a metering tube for pooling a predetermined amount of the solvent which has circulated through the inside. The sample collecting unit 410 sends nitrogen ($N_2$) or pure water ($H_2O$) mainly to the sample collecting unit 410 from the inside of the flow path. The sample collecting unit 410 collects a predetermined amount of the amine absorbing solution by distributing the amine absorbing solution sent from the flow path $P_4$ into the flow path, and sends the collected amine absorbing solution to the solution adjusting unit 420 by distributing nitrogen into the flow path. The sample collecting unit 410 sends pure water to the solution adjusting unit 420, and discharges the amine absorbing solution or pure water in the flow path to the outside, as needed. The on-off valve described in the present specification is a flow rate adjusting on-off valve, and may be an automatic on-off valve which automatically opens and closes according to a signal from the control apparatus 60, or a manual on-off valve that opens and closes manually. In addition, the pump described in the present specification may be automatically controlled by a signal sent from the control apparatus 60, or may be manually controlled.

In addition, the amine absorbing solution collected in the sample collecting unit 410 may contain metal ions such as iron (Fe) ions and heavy metal ions, as metal ions to be analyzed by the analysis apparatus 40. As heavy metal ions, one or more metal ions are supposed which are selected from the group consisting of beryllium (Be), aluminum (Al), magnesium (Mg), calcium (Ca), scandium (Sc), vanadium (V), chromium (Cr), manganese (Mn), cobalt (Co), nickel (Ni), copper (Cu), zinc (Zn), gallium (Ga), arsenic (As), selenium (Se), strontium (Sr), yttrium (Y), zirconium (Zr), molybdenum (Mo), silver (Ag), cadmium (Cd), indium (In) and tin (Sn).

The solution adjusting unit 420 is a flow path which communicates with the sample collecting unit 410 and the chelate adsorption/desorption unit 440; and includes, in the flow path, on-off valves V03 to V06, V10, V13 and V15, pumps P02 and P03, and a first container 421. The first container 421 is provided with a stirrer and a pH meter. The solution adjusting unit 420 sends a pH adjuster, pure water and nitrogen to the first container 421, and exhausts gases in the first container 421. The solution adjusting unit 420 fills the first container 421 with the amine absorbing solution sent from the sample collecting unit 410, adds a pH adjuster to the amine absorbing solution in the first container 421, measures the pH value while stirring the mixture as needed, and adjusts the pH value of the amine absorbing solution to a predetermined range. The solution adjusting unit 420 sends the amine absorbing solution in the first container 421, of which the pH value has been adjusted, to the chelate adsorption/desorption unit 440. The solution adjusting unit 420 fills the first container 421 with pure water, stirs the pure water as needed, and discharges the pure water in the first container 421 to the outside by distributing nitrogen in the flow path. In addition, the solution adjusting unit 420 fills the first container 421 with pure water, exhausts gases in the first container 421, and thereby sends the pure water in the first container 421 to the chelate adsorption/desorption unit 440.

The introduction unit 430 is a flow path which communicates with the chelate adsorption/desorption unit 440. The introduction unit 430 includes, in the flow path: a plurality of flow paths for sending aqueous solutions of a standard solution, methanol ($CH_3OH$), nitric acid ($HNO_3$), acetic acid ($CH_3COOH$) and the like, and pure water each independently to the chelate adsorption/desorption unit 440; and a pump P05.

The chelate adsorption/desorption unit 440 is a flow path which communicates with the solution adjusting unit 420, the introduction unit 430 and the measuring unit 450, and includes a chelating resin packed portion 441, on-off valves V16 to V24, and pumps P04 and P07, in the flow path. A chelating resin is provided inside the chelating resin packed portion 441. The chelate adsorption/desorption unit 440 passes the amine absorbing solution sent from the solution adjusting unit 420 to the chelating resin packed portion 441, and discharges the amine absorbing solution which has passed through, to the outside, and thereby allows the chelating resin to adsorb the iron ions in the amine absorbing solution. The chelate adsorption/desorption unit 440 passes pure water sent from the solution adjusting unit 420 through the chelating resin, and discharges the waste liquid that has passed. The chelate adsorption/desorption unit 440 passes the regenerating solution of an acid through the chelating resin, and sends the solution which has passed, to the measuring unit 450. The chelate adsorption/desorption unit 440 discharges the pure water sent from the first container 421 in the upstream of the chelating resin, or passes the pure water sent from the first container 421 through the chelating resin, and discharges the resultant pure water. In addition, the chelate adsorption/desorption unit 440 sends pure water sent from the first container 421 to a second container 451 in the upstream of the chelating resin. It is also acceptable to install a filter in the upstream of the chelate adsorption/desorption unit 440, pass the amine absorbing solution through the filter, and thereby remove solids in the amine absorbing solution. In addition, it is also acceptable to separately provide a device which adds pure water in the upstream of the filter.

In addition, the chelating resin of the chelate adsorption/desorption unit 440 may be a resin to which the iron ions and/or the heavy metal ions in the amine absorbing solution can bond, and for example, is a resin such as an iminodiacetic acid type [—$N(CH_2COO—)_2$] and a polyamine type [—$NH(CH_2CH_2NH)_n$—$H$], because the resins have high selectivity for iron ions and heavy metal ions; and a resin is preferable which is produced by modification of a base material of a hydrophilic methacrylate by an iminodiacetic acid group.

The measuring unit 450 is a flow path which communicates with the chelate adsorption/desorption unit 440, and includes the second container 451, an optical analyzer, on-off valves V25 to V27 and V31 to 37, and pumps P08 and P12, in its flow path. The second container 451 is provided with a stirrer and an EC meter. The measuring unit 450 sends nitrogen, pure water and a reagent to the second container 451, and exhausts gases in the second container 451. The measuring unit 450 fills the second container 451 with a solution sent from the chelate adsorption/desorption unit 440, adds a predetermined amount of the reagent to the solution in the second container 451, measures an EC value while stirring the mixture as needed, adjusts the EC value of the solution to a predetermined range, and obtains the sample for analysis, which can be measured by the optical analyzer. The measuring unit 450 distributes nitrogen into the flow path, and thereby sends the sample for analysis in the second container 451, of which the EC value has been adjusted, to a third container 452. The measuring unit 450 fills the second container 451 with pure water, distributes nitrogen into the flow path while stirring the pure water as needed, and discharges the pure water in the second container 451 to the outside. The measuring unit 450 fills the second container 451 with pure water to exhaust gases in the second container 451, and thereby discharges the pure water in the second container 451 to the outside. In addition, the measuring unit 450 discharges the sample in the third container 452 by distributing nitrogen into the flow path, or discharges pure water sent from the second container 451, in the upstream of the third container 452.

In addition, the optical analyzer of the measuring unit 450 may be any device which can quantify the iron ions and/or the heavy metal ions in the sample for measurement, and can adopt a device such as an absorptiometer, an atomic absorption spectrometer, an inductively-coupled plasma (ICP) emission spectrometer, and an X-ray fluorescence spectrometer. When the optical analyzer is the absorptiometer, the optical analyzer passes light which has been emitted from the light-emitting portion 452a toward the light-receiving portion 452b and has a specific wavelength, through the sample for measurement in the third container 452, thereby measures the absorbance of the sample for measurement, and quantifies the iron ions and/or the heavy metal ions in the sample for measurement. The measurement result by the optical analyzer is sent to the control apparatus 60. The measuring unit 450 is structured so as to quantify the iron ions and/or the heavy metal ions of the sample for measurement, on the basis of the quantification result, due to the control apparatus 60 or a control unit (not shown) which is optionally provided.

In addition, as is shown in FIG. 1, the system for recovering the acidic gas of the present embodiment further includes a control apparatus 60. The control apparatus 60 includes a heretofore known calculation unit, control unit, storage unit, and input/output unit, and is structured so as to be capable of communicating with at least the reclaiming apparatus 50 and the analysis apparatus 40. Specifically, the control apparatus 60 is structured so as to be capable of communicating with equipment such as the optical measuring device, the on-off valves, the pumps, the stirrers, and meters such as the pH meter and the EC meter, in the analysis apparatus 40. Thereby, the control apparatus 60 has a function of controlling: driving and stopping of the reclaiming apparatus 50; opening and closing of the on-off valves, driving and stopping of the pumps, control of flow rates of fluids such as the amine absorbing solution, pure water, the regenerating solution, the reagent and nitrogen which pass through the on-off valves, in the analysis apparatus 40; and driving and stopping of the optical analyzer.

2. Method for Recovering Acidic Gas

Next, one embodiment of the method for recovering the acidic gas according to the present invention will be described, by describing an operation mode of the system having the structure in the above description. The method for recovering the acidic gas in the present embodiment includes at least a cooling step, an absorption step, a regeneration and recovery step, an analysis step and a reclaiming step.

2.1 Cooling Step

As is shown in FIG. 1, first, the gas to be treated, which contains $CO_2$, is supplied from the flow path $L_0$ to the cooling tower 30, and is cooled. Gases to be treated include natural gas, a process gas which is produced in chemical plants such as for ammonia production, a synthetic gas such as coal gasification gas, and acidic gas such as the combustion exhaust gas of fossil fuel. In the present step, the gas to be treated is cooled to a predetermined temperature by the cooling water sent from the cooler 32, in the packed portion 31 of the cooling tower 30, and then is introduced to the lower part of the absorbing tower 10 through the flow path $L_1$, by the blower $B_1$. The gas to be treated is cooled to, for example, 30 to 40° C. from the viewpoint of absorption efficiency in the absorbing tower 10. The cooling water that has accumulated in the tower bottom of the cooling tower 30 is cooled by the cooler 32 via the flow path $L_2$ by the pump $P_2$, then is supplied to the cooling tower 30, and is recycled.

2.2 Absorption Step

The gas to be treated which has been introduced into the absorbing tower 10 from the flow path $L_1$ is brought into counter current contact with the amine absorbing solution which has been introduced from the flow path $L_8$, in the lower packed portion 11a; and $CO_2$ in the gas to be treated is absorbed by the amine absorbing solution, and $CO_2$ is removed from the gas to be treated. As a result, 90% or more of $CO_2$ can be removed from the gas to be treated. The amine absorbing solution is an aqueous solution of an amine compound; and as the amine compound, alkanolamines can be used such as monoethanolamine, diethanolamine, diisopropanolamine, methyldiethanolamine and triethanolamine. The gas to be treated from which $CO_2$ has been removed entrains moisture and an amine compound which have evaporated at a high temperature because of an exothermic reaction due to $CO_2$ absorption. Thus, the gas is brought into contact with a cleaning liquid in the upper packed portion 11b, and the moisture and the amine compound in the gas are condensed and recovered by the cleaning liquid. The gas to be treated from which $CO_2$ has been removed is discharged from the top of the absorbing tower 10 via the flow path $L_3$, and is recovered. In addition, the cleaning liquid containing the moisture content and the amine compound accumulates in the water receiving portion 11c, and thus, a part of the cleaning liquid is cooled by the cooler 13 via the flow path $L_5$ by the pump $P_5$, and then is supplied to above the upper packed portion 11b of the absorbing tower 10 and is recycled as the cleaning liquid; and at the same time, the other part is added to the flow path $L_8$ which supplies the lean absorbing solution via the flow path $L_{5a}$, as an excessive content, in order to be reused as the absorbing solution. The rich absorbing solution which has absorbed $CO_2$ accumulates in the tower bottom of the absorbing tower 10; and a part thereof is heated by the heat exchanger 25 via the flow path $L_4$, and then is supplied to the regenerating tower 20. The amine absorbing solution in the flow path $L_4$ is collected as a sample of which the concentration of the iron ions and/or the heavy metal ions is measured every predetermined time in the analysis apparatus 40.

2.3 Regeneration and Recovery Step

The rich absorbing solution that has been supplied to the regenerating tower 20 from the flow path $L_4$ flows down while releasing $CO_2$ due to the endothermic reaction in the lower packed portion 21a, accumulates in the absorbing solution receiving portion 21c, and is supplied to a reboiler 22 via the flow path $L_7$; and the temperature is raised by heat exchange with the high-temperature saturated steam sent from the flow path $L_6$. Thereby, the rich absorbing solution releases $CO_2$ contained therein. The saturated steam which has been introduced into the reboiler 22 is condensed by heat exchange with the absorbing solution to become saturated water which is discharged from the reboiler 22. The lean absorbing solution that has dissipated $CO_2$ accumulates in the tower bottom of the regenerating tower 20. The $CO_2$ gas that has been separated from the absorbing solution is brought into gas-liquid contact with the reflux water which has been supplied from the flow path $L_9$, in the upper packed portion 21b of the regenerating tower 20; thereby the entrained amine absorbing solution is removed; and then the resultant $CO_2$ gas is discharged from the top of the regenerating tower 20 via the flow path $L_{10}$. The $CO_2$ gas is cooled by the cooler 23 to thereby condense the entrained water vapor, and is separated into $CO_2$ gas and condensed water, in the gas-liquid separator 24. The separated $CO_2$ gas is discharged via the flow path $L_{11}$, and is recovered as high-purity $CO_2$ gas; and the condensed water is supplied to the regenerating tower 20 via the flow path $L_9$ by the pump $P_9$, and is reused as the reflux water. The lean absorbing solution that has accumulated in the tower bottom of the regenerating tower 20 is introduced into the heat exchanger 25 via the flow path $L_8$, is cooled by heat exchange with the rich absorbing solution, is further cooled by the cooler 12, then is supplied to the absorbing tower 10, and is recycled as the amine absorbing solution for absorbing $CO_2$. The temperature of the amine absorbing solution to be supplied to the absorbing tower 10 can be adjusted by the heat exchanger 25 and the cooler 12.

2.4 Analysis Step

Next, an analysis step according to the present embodiment will be described with reference to FIG. 2. The analysis step includes at least a collection step, a first solution adjustment step, a chelating resin adsorption step, a chelating resin desorption step, a second solution adjustment step, a measurement step, and a calculation step.

First, in the analysis step, pure water which has accumulated in the first container 421, the second container 451, and the third container 452 of the analysis apparatus 40 shown in FIG. 2 are discharged to the outside. By the on-off valves V13, V10, V32, V37, V05 and V25 being turned to an opened state, the pure water in the first container 421 is discharged to the outside together with nitrogen, and the pure water in the second container 451 is discharged to the outside together with nitrogen. In addition, by the on-off valves V34, V35, V37 and V33 being turned to an open state, the pure water in the third container 452 is discharged to the outside together with nitrogen.

In the collection step, a predetermined amount of the amine absorbing solution is collected from the flow path $L_4$, for the purpose of quantification of the iron ions and/or the heavy metal ions in the amine absorbing solution. By the on-off valves V02, V12 and V08 being turned to an open state, and by the pump P01 being driven, the amine absorbing solution of the flow path $L_4$ is distributed into the flow path of the sample collecting unit 410. The amine absorbing solution which circulates in the flow path of the sample collecting unit 410 passes through the metering tube in the flow path, and returns to the flow path $L_4$. By the on-off valves V02, V12 and V08 being turned to a closed state, and the pump P01 being stopped, in the state in which the amine absorbing solution circulates in the flow path of the sample collecting unit 410, a predetermined amount of the amine absorbing solution is collected. The amount of the collected amine absorbing solution is stored in the control apparatus 60. Next, by the on-off valves V07, V14, V06 and V01 being turned to an opened state, the amine absorbing solution in the flow path of the sample collecting unit 410 is sent to the first container 421 together with nitrogen. The amine absorbing solution moves into the first container 421, and at the same time, air in the first container 421 is exhausted. Next, the on-off valves V09, V07, V14 and V06 being turned to an open state, and the pump P06 being driven, the amine absorbing solution remaining in the flow path of the sample collecting unit 410 is sent to the first container 421 together with pure water, and the flow path is also cleaned. When the pH value in the first container 421 has exceeded 7, the pump P06 is stopped. Furthermore, by the on-off valves V07, V14, V06 and V01 being turned to the open state, pure water in the flow path of the sample collecting unit 410 is sent to the first container 421 together with nitrogen.

In the solution adjustment step, the pH value of the amine absorbing solution in the first container 421 is adjusted until the iron ions adsorb to the chelating resin. By the on-off valves V03 and V06 being turned to the open state, and by the pump P02 and the stirrer being driven, the pH adjuster is supplied into the first container 421, and the pH value of the amine absorbing solution is adjusted. When the pH value of the amine absorbing solution in the first container 421 becomes within a predetermined range, the pump P02 and the stirrer are stopped. The pH adjusters include aqueous solutions of hydrochloric acid (HCl), nitric acid, sulfuric acid ($H_2SO_4$) and the like. Among the aqueous solutions, an aqueous solution of hydrochloric acid (volume ratio of 1:1) is preferable from a practical viewpoint. The pH value of the amine absorbing solution is preferably 2 or higher and 9 or lower.

In the subsequent chelating resin adsorption step, the amine absorbing solution is passed through the chelating resin, and thereby the iron ions and/or the heavy metal ions in the amine absorbing solution are allowed to adsorb to the chelating resin. By the on-off valves V06, V13, V15, V18 to V21 and V24 being turned to the opened state, and by the pump P07 being driven, the amine absorbing solution in the first container 421 is passed through the chelating resin in the chelating resin packed portion 441. The amine absorbing solution after having passed through the chelating resin is discharged to the outside. Thereby, the iron ions and/or the heavy metal ions in the amine absorbing solution are allowed to adsorb to the chelating resin. In other words, the iron ions and/or the heavy metal ions to be analyzed in the amine absorbing solution are separated from organic substances such as amine compounds. The amount of the amine absorbing solution to be supplied is, for example, 10 mL, and the flow rate by the pump P07 can be set at, for example, 5 mL/min. In addition, it is acceptable to pass the amine absorbing solution through a filter before the chelating resin adsorption step, and thereby to remove solids in the amine absorbing solution. Thereby, blockage in the chelating resin can be prevented. Furthermore, the amine absorbing solution may be diluted by the addition of pure water. Thereby, the viscosity of a solution can be lowered, and the speed of the solution passing through the filter or the chelating resin can rise.

In the subsequent pure water cleaning step, pure water is passed through the chelating resin to wash away organic substances such as amine compounds, which have bonded to the chelating resin. By the on-off valves V04 and V06 being turned to the opened state, and by the pump P03 being driven, the first container 421 is filled with pure water. Next, by the on-off valves V06, V13, V15, V18 to V21 and V24 being turned to the opened state, and by the pump P07 being driven, pure water in the first container 421 is passed to the chelating resin in the chelating resin packed portion 441. Organic substances such as amine compounds, which have bonded to the chelating resin, are discharged to the outside together with pure water. The amount of the pure water to be supplied is, for example, 10 mL, and the flow rate by the pump P07 can be set at, for example, 5 mL/min.

In the subsequent chelating resin desorption step, the acidic regenerating solution is passed through the chelating resin which has adsorbed the iron ions and/or the heavy metal ions, and thereby allows the chelating resin to desorb the iron ions and/or the heavy metal ions, and to be regenerated; and at the same time, a solution containing iron ions is obtained. By the on-off valves V19 to V23 and V26 being turned to the opened state, and by the pump P04 being driven, the acidic regenerating solution is passed through the chelating resin in the chelating resin packed portion 441, and also a solution which has passed is sent to the second container 451. Thereby, the solution containing the iron ions and/or the heavy metal ions which have desorbed from the chelating resin is moved to the second container 451 in the measuring unit 450. The solution moves into the second container 451, and at the same time, air in the second container 451 is exhausted. The acidic regenerating solutions include aqueous solutions of nitric acid, hydrochloric acid and the like. Among the aqueous solutions, an aqueous solution of nitric acid is preferable, an aqueous solution of 1 to 3 mol/L of nitric acid is preferable, and an aqueous solution of 2 mol/L of nitric acid is more preferable. The amount of the aqueous solution of nitric acid to be supplied is, for example, 10 mL, and the flow rate by the pump P07 can be set at, for example, 5 mL/min.

In the subsequent measurement adjustment step, the solution in the second container 451 is adjusted to such a state that the iron ions contained in the solution can be measured by the optical analyzer, and thereby, a sample for measurement is obtained. By the on-off valves V31 and V26 being turned to an open state, and by the pump P12 and the stirrer being driven, a reagent is supplied into the second container 451, and this is stirred together with the solution. The reagent moves into the second container 451, and at the same time, air in the second container 451 is exhausted. The reagent may be a reagent due to which the iron ions and/or the heavy metal ions in the solution can be quantified when the optical analyzer is used. Examples of usable reagents include aqueous solutions of hydrochloric acid (HCl), hydroxylammonium chloride ($HONH_3Cl$), o-phenanthroline ($C_{12}H_8N_2$) and ammonium acetate ($CH_3COONH_4$). The amount of each reagent can be set at, for example, 0.4 mL for an aqueous solution of hydrochloric acid (volume ratio of 1:1), 0.1 mL for an aqueous solution of 100 g/L of hydroxylammonium chloride, 0.5 mL for 0.1 wt % o-phenanthroline solution, and 1 mL for an aqueous solution of 500 g/L of ammonium acetate. In addition, it is preferable to supply reagents each independently from a plurality of channels each having a flow path and a pump. Next, by the on-off valves V27 and V26 being turned to an opened state, and by the pump P08 being driven, while the stirrer is driven, pure water is added to the second container 451. Pure water moves to the second container 451, and at the same time, air in the second container 451 is exhausted. After the pure water has been supplied, measurement with the EC meter is also performed. When the electric conductivity of the solution in the second container 451, which has been measured with the EC meter, has increased to a predetermined value, the pump P08 and the stirrer are stopped. The obtained solution in the second container 451 is determined to be the sample for measurement. The value of the EC meter can be set at, for example, 30 S/m.

In the subsequent measurement step, the iron ions and/or the heavy metal ions in the sample for measurement are quantified by the optical analyzer. After the measurement adjustment step, the solution in the second container 451 is left for a predetermined time, for example, about 5 minutes. By the on-off valves V32, V34 to V36 and V25 being turned to an open state, the sample for measurement in the second container 451 is sent to the third container 452 together with nitrogen. Monochromatic light emitted from the light-emitting portion 452a and the light-receiving portion 452b is passed through the third container 452, and thereby, the absorbance of the sample for measurement is measured. A measuring method which is used in the optical analyzer may be any method as long as the method can quantify the iron ions and/or the heavy metal ions in the solution, and can adopt a method, for example, such as an atomic absorption spectrometry, an inductively-coupled plasma (ICP) emission spectroscopy, and a fluorescent X-ray analysis. In the case in which the absorptiometric method is used, the wavelength of the monochromatic light may be any wavelength which can quantify the iron ions and/or the heavy metal ions, and can be set at, for example, 510 nm. The measurement result by the optical analyzer is transmitted to the control apparatus 60.

In the subsequent calculation step, the concentrations (mg/L) of the iron ions and/or the heavy metal ions in the sample for measurement are calculated from the measurement result of the measurement step. As is shown in the following formula (I), the concentration of the iron ions in the sample for measurement can be calculated from the absorbance A (Abs.) of a reference sample in which the iron ion concentration (mg/L), for example, is ascertained in advance, and the absorbance B (Abs.) of the sample for measurement, which has been measured by the measuring unit 450. In addition, for example, the iron ion concentration (mg/L) in the amine absorbing solution can be calculated from the calculated concentration (mg/L) of the iron ions, the volume D (L) of the second container 451 and the amount of the collected amine absorbing solution (L), as is shown in the following Formula (II). The amount of the collected amine solution may be determined to be a solution mass (E×ρ), with the use of density ρ (kg/L) which has been separately calculated from a composition of the amine absorbing solution. In this case, the iron ion concentration (mg/kg) in the amine absorbing solution can be calculated. The concentration of the iron ions in the amine absorbing solution and the concentration of the heavy metal ions in the amine absorbing solution can be calculated separately by repetition of the analysis step. In order to calculate concentrations of two different types of metal ions, it is preferable to calculate a concentration of a first type of metal ion in a calculation step, to pass a cleaning step and a standby step which will be described later, and then to perform the analysis step and calculate the concentration of the second type of metal ion.

[Equation 1]

$$Y = B/(A/C) \quad (I)$$

$$Z = Y \times D/E \quad (II)$$

2.5 Reclaiming Step

When the concentrations of the calculated iron ions and/or the calculated heavy metal ions have exceeded predetermined threshold values, the reclaiming apparatus 50 is activated, and thereby removes the iron ions and/or the heavy metal ions in the amine absorbing solution. Specifically, as is shown in FIG. 1, the reclaiming apparatus 50 is activated by the control apparatus 60, a part of the amine absorbing solution is introduced into the reclaiming apparatus 50 from the flow path $L_{81}$, and the amine absorbing solution is heated to a temperature at which the amine compound evaporates in an evaporator (not shown). The evaporated amine compound is liquefied by a cooler (not shown), is regenerated as an amine absorbing solution, is returned from the flow path $L_{83}$ to the flow path $L_8$ of the lean absorbing solution, and is reused. Iron ions, an oxidative degradation product of the amine compound and the like which have not evaporated and remained are discharged from the flow path $L_{82}$ as sludge. Such a method of removing the metal ions in the amine absorbing solution may be any method as long as the method can remove the iron ions and/or the heavy metal ions from the amine absorbing solution; and methods except for the thermal reclaiming can adopt methods such as an electrodialysis method and an ion exchange method.

In addition, when the concentrations of the iron ions and/or the heavy metal ions have become a predetermined threshold or lower, the control apparatus 60 instructs to stop. The control apparatus 60 stops the reclaiming apparatus 50 and stops the analysis step of the analysis apparatus 40. In the present embodiment, the analysis time period of the iron ions and/or the heavy metal ions in the analysis apparatus 40 can be shortened, and thus, when the concentrations of the iron ions and/or the heavy metal ions have exceeded the thresholds, the measurement frequency of the ions may be increased. The thresholds of the concentrations of the iron ions and/or the heavy metal ions are preferably as low values as possible, and may be set, for example, in a range of 1 to 10 ppm; or a quantification limit value of the quantification device for the iron ions, such as an absorptiometer 46, may be set as the threshold.

Figure 3:
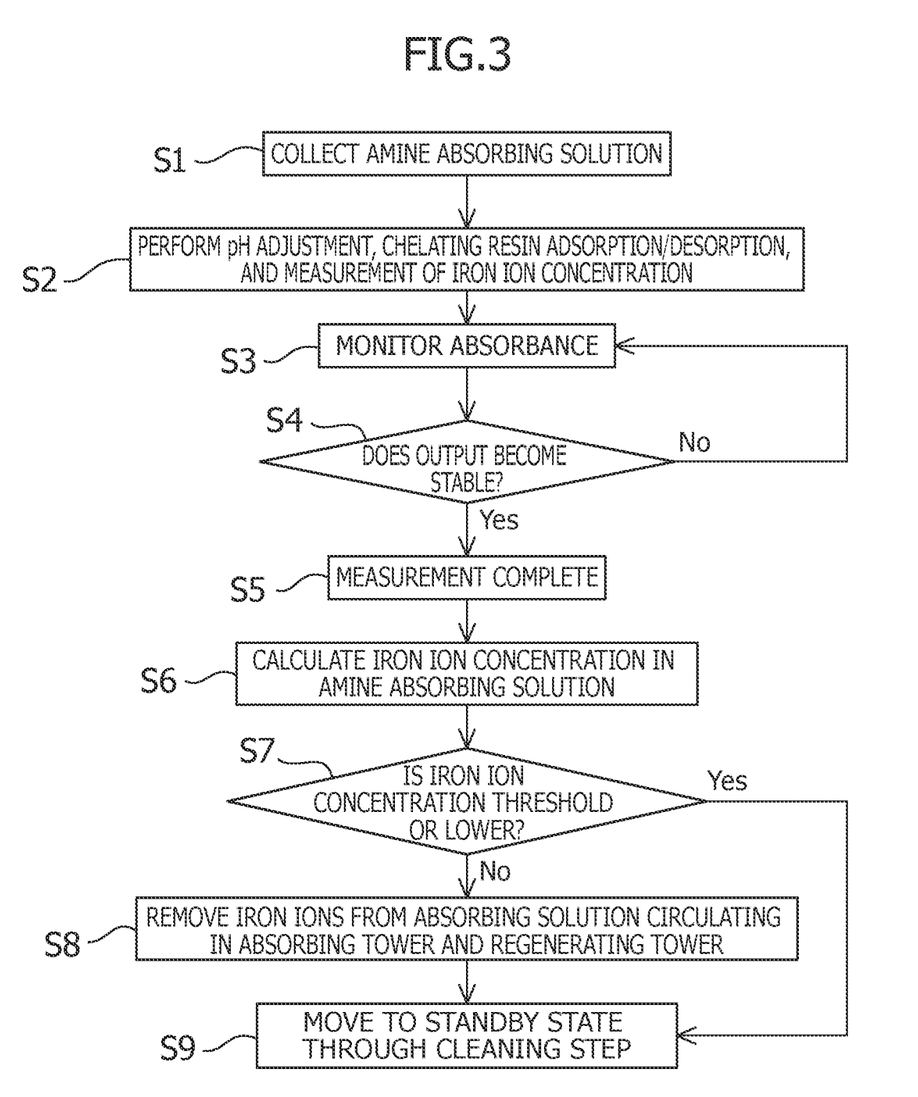
FIG. 3 shows a flowchart showing an outline of a method for recovering the acidic gas according to the present invention.

The process as in the above can be automatically controlled by the control apparatus 60. For example, as is shown in FIG. 3, due to the control apparatus 60, the amine absorbing solution is collected (S1), the pH of the collected amine absorbing solution is adjusted, the iron ions adsorb and desorb to the chelating resin, and the iron ion concentration is measured (S2). In addition, the control apparatus 60 monitors the absorbance which has been measured by the measuring unit 450 (S3), controls the measuring unit 450 to a standby state until the output of the optical analyzer becomes stable (S4), and uses the measurement result after the output has become stable, as measurement data (S5). The control apparatus 60 determines whether the concentration of the iron ions in the amine absorbing solution is equal to or lower than the threshold value from the measurement result and the data in the analysis apparatus 40 (S7); and when the concentration of the iron ions has exceeded the threshold, activates the reclaiming apparatus 50 to remove the iron ions from the amine absorbing solution which circulates in the absorbing tower 20 and the regenerating tower 30 (S8). When the concentration of the iron ions has become equal to or lower than the threshold, the control apparatus 60 stops the reclaiming apparatus 50, also stops the analysis step, and performs a standby step through a cleaning step (S9) which will be described later. In addition, also in the case in which the metal ions to be the object are heavy metal ions, the process can be automatically controlled by the control apparatus 60, as described above.

Thus, the method for recovering the acidic gas of the present embodiment monitors the concentrations of the iron ions and/or the heavy metal ions in the amine absorbing solution, and thereby can detect a sign that the corrosivity of the amine absorbing solution increases, in an early stage. Thus, the method can start the removal operation of the iron ions and/or the heavy metal ions that are a factor which increases the corrosivity of the amine absorbing solution, at an appropriate timing. As a result, the method can continue a stable operation in which the corrosion of the equipment materials is prevented. In addition, the method can keep concentrations of metal ions such as the iron ions, which work as a catalyst for the oxidative degradation reaction of amines in the amine absorbing solution, at low concentrations, and thus can reduce the lowering of the concentrations of amine compounds in the absorbing solution due to the oxidative degradation. As a result, the method can continue an operation of which the performance of removing the acidic gas is stable.

Furthermore, the method selectively extracts the iron ions and/or the heavy metal ions in the amine absorbing solution by the chelating resin and quantifies the ions, thereby simplifies a pretreatment operation, and can shorten the necessary time period. As a result, the method can quantify the iron ions and/or the heavy metal ions (for example, 0.5 mg/L or higher) in the amine absorbing solution, in 1 to 2 hours. Thus, the method can collect a part of the amine absorbing solution which is recycled, send the part to the analysis apparatus 40, and measure the concentrations of the iron ions and/or the heavy metal ions in the amine absorbing solution, at every predetermined time, for example, twice/day. On the other hand, if wet oxidative decomposition operations, for example, such as addition of acid, heating, boiling and cooling are repeated many times, so as to remove the organic substances in the amine absorbing solution, the pretreatment operation thereby becomes complicated, and about 72 hours, for example, are necessary. As a result, it requires several days to quantify the iron ions and/or the heavy metal ions in the amine absorbing solution.

2.5 Cleaning Step

In addition, the method for recovering the acidic gas of the present embodiment can further include a cleaning step, a standby step, a calibration step and a conditioning step. The cleaning step is performed in a state in which the analysis step is stopped, in other words, after the analysis step. The cleaning step can clean the equipment and flow paths in the analysis apparatus 40, which have been used in the analysis step. The cleaning step can clean the first container 421, the flow path between the first container 421 and the chelating resin packed portion 441, the chelating resin packed portion 441, the flow path between the chelating resin packed portion 441 and the second container 451, the second container 451, the flow path between the second container 451 and the third container 452, and the third container 452.

As is shown in FIG. 2, by the on-off valves V04 and V06 being turned to an open state, and by the pump P03 being driven, pure water is supplied to and is filled into the first container 421 (hereinafter also referred to as the first pure water charging treatment). By the stirrer being driven in the first container 421, the amine absorbing solution remaining in the first container 421 is dissolved in pure water. Next, by the on-off valves V13, V10 and V05 being turned to an opened state, the amine absorbing solution remaining in the first container 421 is discharged to the outside together with nitrogen. Thereby, the first container 421 is cleaned.

In addition, after the first pure water charging treatment is performed, by the on-off valves V06, V13, V15 and V17 being turned to an opened state, and by the pump P07 being driven, the pure water in the first container 421 is discharged to the outside in the upstream of the chelating resin packed portion 441. Thereby, the flow path between the first container 421 and the chelate adsorption/desorption unit 440 is cleaned. Next, after the first pure water charging treatment is performed, by the on-off valves V06, V13, V15, V18 to V21 and V24 being turned to the opened state, and by the pump P07 being driven, the pure water in the first container 421 is allowed to pass through the chelating resin in the chelating resin packed portion 441. The solution which has passed through the chelating resin packed portion 441 is discharged to the outside. The flow rate by the pump P07 can be set at, for example, 3 mL/min. Thereby, the chelating resin packed portion 441 and the chelating resin inside thereof are cleaned.

Furthermore, after the first pure water charging treatment, by the on-off valves V06, V13, V15, V18, V23 and V26 being turned to the opened state, and by the pump P07 being driven, pure water in the first container 421 is allowed to pass through the upstream of the chelating resin packed portion 441, and is sent to the second container 451. After that, by the on-off valves V32, V37 and V25 being turned to the opened state, the solution in the second container 451 is discharged to the outside together with nitrogen, in the upstream of the third container 452. Thereby, the flow path between the chelating resin packed portion 441 and the second container 451 is cleaned.

In addition, by the on-off valves V27 and V26 being turned to the opened state, and by the pump P08 being driven, pure water is supplied to and is filled into the second container 451 (hereinafter also referred to as second pure water charging treatment). By the stirrer being driven in the second container 451, the reagent and the like remaining in the second container 451 are dissolved in pure water. After that, by the on-off valves V32, V37 and V25 being turned to the opened state, the reagent and the like remaining in the second container 451 are discharged to the outside together with nitrogen. Thereby, the second container 451 is cleaned.

In addition, after the second pure water charging treatment, by the on-off valves V32, V34, V35, V36 and V25 being turned to the open state, the pure water in the second container 451 is sent to the third container 452 together with nitrogen. The solution which has passed through the third container 452 is discharged to the outside together with nitrogen. After that, by the on-off valves V33 to 35 and V37 being turned to the opened state, a residual substance in the third container 452 is discharged to the outside together with nitrogen. Thereby, the flow path between the second container 451 and the third container 452 and the third container 452 are cleaned.

2.6 Standby Step

In the standby step, after the cleaning step, and after the calibration step or the conditioning step, pure water is filled into the equipment which is used in the analysis step, specifically, each of the first container 421, the second container 451 and the third container 452. First, the first container 421 is filled with pure water by the first pure water charging treatment, and the second container 451 is filled with pure water by the second pure water charging treatment. In addition, after the second pure water charging treatment, by the V32, V34, V36 and V25 being turned to an opened state, the pure water in the second container 451 is supplied into the third container 452. Excess pure water is discharged to the outside from the third container 452. Thereby, the third container 452 is filled with pure water. As a result, the analysis apparatus 40 is in a standby state in which the analysis step can be started.

2.7 Calibration Step

In the calibration step, the optical analyzer is calibrated by using a standard solution. The standard solution may be any solution which can calibrate the optical analyzer. The present step can be performed after the cleaning step, the standby step or the conditioning step, in a state in which the analysis step is stopped. When the present step is performed after the standby step, the on-off valves V32, V37 and V25 are turned to the open state, and thereby the pure water in the second container 451 is discharged together with nitrogen. The present step may be performed manually, or may be performed automatically by the control apparatus 60.

By the on-off valves V16, V19, V23 and V26 being turned to the opened state, and by the pump P05 being driven, the standard solution is sent to the second container 451 through the upstream of the chelating resin packed portion 441. Thereby, the second container 451 is filled with the standard solution. Next, the same steps as the measurement adjustment step, the measurement step and the calculation step are performed which have been previously described, and thereby, the optical analyzer is calibrated. As the value of the EC meter, the same value as in the measurement adjustment step which have been previously described, for example, can be adopted. After the same step as the calculation step has been performed and the calibration of the optical analyzer has been completed, the on-off valves V33 to 35 and V37 are turned to the open state, and thereby, the standard solution in the third container 452 is discharged to the outside together with nitrogen.

2.8 Conditioning Step

In the conditioning step, the chelating resin in the chelate adsorption/desorption unit 440 is regenerated. The present step can be performed after the cleaning step, the standby step or the calibration step, in a state in which the analysis step is stopped. First, by the on-off valves V16, V20, V22 and V24 being turned to the opened state, and by the pump P05 being driven, methanol sent from the introduction unit 430 is passed to the chelating resin in the chelating resin packed portion 441, and after having passed through the chelating resin, the methanol is discharged to the outside. The amount of methanol is, for example, 5 ml, and the flow rate of the pump P05 can be set at, for example, 3 mL/min. Next, the aqueous solution of nitric acid sent from the introduction unit 430 is passed to the chelating resin in the chelating resin packed portion 441, and after having passed through the chelating resin, is discharged to the outside. The aqueous solution of nitric acid is preferably an aqueous solution of 1 to 3 mol/L of nitric acid, and is more preferably an aqueous solution of 2 mol/L of nitric acid. The amount of the aqueous solution of nitric acid to be supplied is, for example, 10 mL, and the flow rate by the pump P05 can be set at, for example, 3 mL/min.

Next, pure water sent from the introduction unit 430 is passed to the chelating resin in the chelating resin packed portion 441, and after having passed through the chelating resin, is discharged to the outside. The amount of the pure water to be supplied is, for example, 5 mL, and the flow rate of the pump P05 is, for example, 3 mL/min. In addition, an aqueous solution of acetic acid sent from the introduction unit 430 is passed to the chelating resin in the chelating resin packed portion 441, and after having passed through the chelating resin, is discharged to the outside. The concentration of the aqueous solution of acetic acid is, for example, 0.5 mol/L, the amount supplied is, for example, 10 mL, and the flow rate of the pump P05 is, for example, 3 mL/min.

Example

Examples of the present invention will be described below. The method for recovering the acidic gas and the system for recovering the acidic gas according to the present invention are not limited to the Examples described below.

1. Preparation of Sample for Measurement

As the Example, samples for measurement each containing iron ions were prepared by procedures of: adding iron ions to five amine absorbing solutions having the same concentration, respectively, so that the five amine absorbing solutions have different concentrations from each other; then allowing these five types of amine absorbing solutions to permeate the chelating resins; subsequently washing the chelating resin out with pure water; and then allowing an aqueous solution of 2 mol/L of nitric acid to pass through the chelating resin, as a regenerating solution. As the Comparative Example, samples for measurement were prepared by procedures of repeating the following operations many times until the amine compound completely decomposed: using five amine absorbing solutions having the same different iron ion concentrations as in the Example; and adding nitric acid, heating, boiling and further cooling the mixture, in order to decompose the amine compound in the amine absorbing solution, according to the wet oxidative decomposition method specified in JISK0102 (2013).

2. Quantification of Iron Ions

Figure 4:
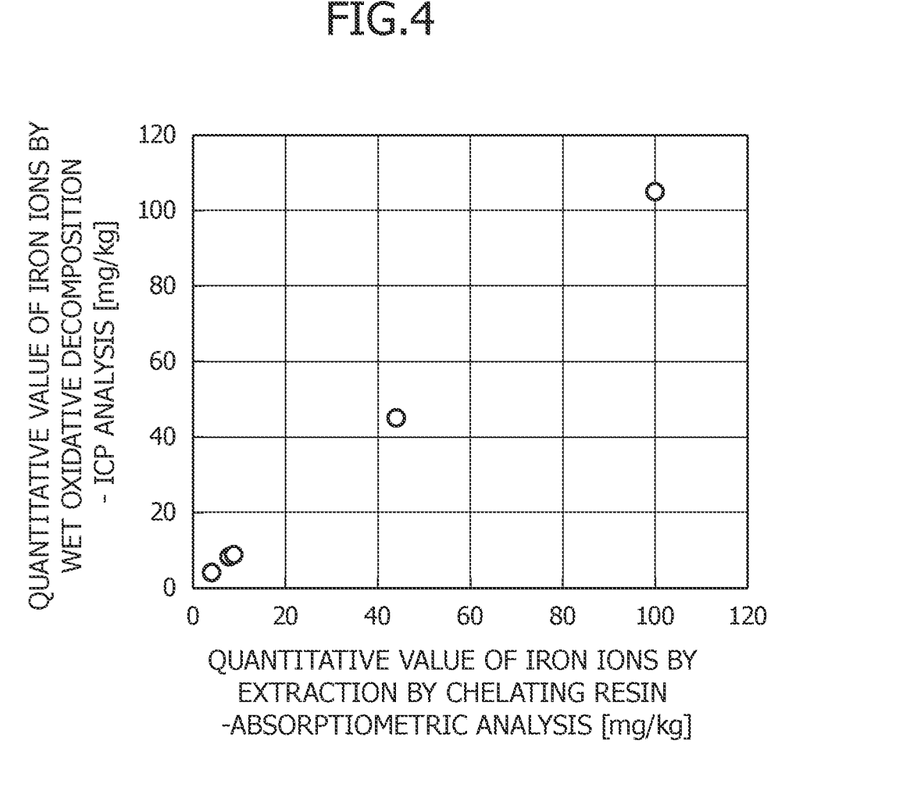
FIG. 4 shows a graph showing a relationship between a quantified value of iron ions in the method and system for recovering the acidic gas according to the present invention and the quantified value of the iron ions according to the conventional JIS standard method.

The samples for measurement in the Example were subjected to the measurement of the absorbances of the samples for measurement, by an absorption photometer (manufactured by Shimadzu Corporation, product number: UVmini-1240); and the iron ion concentrations (mg/kg) in the amine absorbing solutions were calculated from the measured values and each volume of the amine absorbing solutions and the regenerating solutions, with the use of a calibration curve which was created with the use of standard solutions of iron. In addition, the iron ion concentrations (mg/kg) in the amine absorbing solutions of the samples for measurement in the Comparative Example were measured, according to the method specified in JISK0102 (2013), by the ICP emission spectrometer (manufactured by Shimadzu Corporation, product number: ICPS-7510). These results are shown in FIG. 4. In FIG. 4, the iron ion concentrations in the Example were taken as the horizontal axis, and the iron ion concentrations in the Comparative Example were taken as the vertical axis; and the accuracies were compared. As is shown in FIG. 4, the iron ion concentrations in the Example, which were quantified by the analysis method of the iron ions according to the present invention, almost coincided with the iron ion concentrations in the Comparative Example, which were quantified according to the JIS standard and had high accuracy. Thus, it has been found that according to the analysis method of the iron ions according to the present invention, the pretreatment using the chelating resin can be performed in a short time, and at the same time, a result also concerning the iron ion concentration can be obtained with high accuracy.

INDUSTRIAL APPLICABILITY

The method and system for recovering the acidic gas according to the present invention can quantify metal ions such as iron ions and heavy metal ions in an amine absorbing solution in a short time and with high accuracy, and can remove factors which increase the corrosivity of the amine absorbing solution, in an early stage.

REFERENCE SYMBOL LIST

10 Absorbing tower
11a and 21a Lower packed portion
11b and 21b Upper packed portion
11c Water receiving portion
12, 13, 23 and 32 Cooler
20 Regenerating tower
21c Absorbing solution receiving portion
22 Reboiler
24 Gas-liquid separator
25 Heat exchanger
30 Cooling tower
31 Packed portion
40 Analysis apparatus
50 Reclaiming apparatus
60 Control apparatus
410 Sample collecting unit
420 Solution adjusting unit
421 First container
430 Introduction unit
440 Chelate adsorption/desorption unit
441 Chelating resin packed portion
450 Measuring unit
451 Second container
452 Third container
452a Light-emitting portion
452b Light-receiving portion

The invention claimed is:

1. A method for recovering an acidic gas, comprising:
a step of bringing a gas to be treated that contains an acidic gas into gas-liquid contact with an amine absorbing solution, allowing the amine absorbing solution to absorb the acidic gas, thereby removing the acidic gas from the gas to be treated and causing the amine absorbing solution to contain iron ions and at least one of heavy metal ions dissolved from an iron-based equipment material, the heavy metal ions being selected from a group consisting of ions of at least one of beryllium (Be), aluminum (Al), magnesium (Mg), calcium (Ca), scandium (Sc), vanadium (V), chromium (Cr), manganese (Mn), cobalt (Co), nickel (Ni), copper (Cu), zinc (Zn), gallium (Ga), arsenic (As), selenium (Se), strontium (Sr), yttrium (Y), zirconium (Zr), molybdenum (Mo), silver (Ag), cadmium (Cd), indium (In) and tin (Sn);
a step of allowing the amine absorbing solution that has absorbed the acidic gas to release the acidic gas, thereby regenerating the amine absorbing solution, and at the same time, recovering the released acidic gas; and an analysis step of calculating concentrations of the heavy metal ions in the amine absorbing solution after contact with the gas to be treated or after regeneration, wherein the analysis step comprises:

a step of adjusting a pH value of the amine absorbing solution after contact with the gas to be treated or after regeneration, the amine absorbing solution having been collected, to a predetermined range by adding a pH adjuster to the amine absorbing solution having been collected;

a step of passing the amine absorbing solution of which the pH value has been adjusted through a chelating resin, and thereby allowing the chelating resin to adsorb the heavy metal ions in the amine absorbing solution;

a step of passing an acidic regenerating solution through the chelating resin that has adsorbed the heavy metal ions, thereby allowing the heavy metal ions to desorb, regenerating the chelating resin, and at the same time, obtaining a sample containing heavy metal ions; and a step of quantifying the heavy metal ions in the sample for measurement, and calculating the concentrations of the heavy metal ions in the collected amine absorbing solution, from the quantification results, wherein, in the analysis step, the concentration of the heavy metal ions in the collected amine absorbing solution are calculated according to the following formulae (I) and (II):

$$Y = B/(A/C) \quad (I)$$

$$Z = Y \times D/E \quad (II)$$

wherein Y is the concentration (mg/L) of the heavy metal ions in the sample for measurement, A is an absorbance (Abs.) of a reference sample, B is the absorbance (Abs.) of the sample for measurement, C is a concentration (mg/L) of the heavy metal ions in the reference sample, Z is a concentration (mg/L) of the heavy metal ions in the collected amine absorbing solution, D is a volume (L) of a container for quantifying the collected amine absorbing solution, and E is an amount (L) of the collected amine absorbing solution.

2. The method for recovering the acidic gas according to claim 1, comprising quantifying the heavy metal ions in the sample by using an absorptiometric method.

3. The method for recovering the acidic gas according to claim 1, further comprising a step of removing the heavy metal ions in the amine absorbing solution after regeneration, when the calculated concentration of the heavy metal ions in the amine absorbing solution has exceeded a threshold.

4. The method for recovering the acidic gas according to claim 1, further comprising a step of stopping the analysis step when the calculated concentration of the heavy metal ions in the amine absorbing solution is at a predetermined threshold or lower, and at the same time, cleaning equipment and a flow path that have been used in the analysis step.

5. The method for recovering the acidic gas according to claim 4, further comprising:

a step of calibrating an apparatus that has been used for quantifying the heavy metal ions in the sample, or an additional conditioning step of regenerating the chelating resin that has been used in the analysis step, in a state of stopping the analysis step.

6. The method for recovering the acidic gas according to claim 5, wherein in the calculation step, the concentration of the iron ions and the concentration of the heavy metal ions in the collected amine absorbing solution are calculated separately by repetition of the step, and after the concentration of one of the iron ions and the heavy metal ions has been calculated, the cleaning step and a standby step have been performed, the standby step comprising filling pure water into equipment which is used in the analysis step after the cleaning step, the concentration of the other of the iron ions and the heavy metal ions is calculated.

7. A system for recovering an acidic gas comprising:

an absorbing tower that brings a gas to be treated which contains the acidic gas into gas-liquid contact with an amine absorbing solution, allowing the amine absorbing solution to absorb the acidic gas, and thereby removing the acidic gas from the gas to be treated and causing the amine absorbing solution to contain iron ions and at least one of heavy metal ions dissolved from an ion-based equipment material, the heavy metal ions being selected from a group consisting of ions of at least one of beryllium (Be), aluminum (Al), magnesium (Mg), calcium (Ca), scandium (Sc), vanadium (V), chromium (Cr), manganese (Mn), cobalt (Co), nickel (Ni), copper (Cu), zinc (Zn), gallium (Ga), arsenic (As), selenium (Se), strontium (Sr), yttrium (Y), zirconium (Zr), molybdenum (Mo), silver (Ag), cadmium (Cd), indium (In) and tin (Sn);

a regenerating tower that is connected to the absorbing tower via a flow path for sending a part of the amine absorbing solution having absorbed the acidic gas and that allows the amine absorbing solution which has absorbed the acidic gas in the acidic gas absorbing tower to release the acidic gas, thereby regenerating the amine absorbing solution, and at the same time, recovering the released acidic gas; and an analysis apparatus that is connected to the flow path on a side of the absorbing tower via a branched flow path branched from the flow path and that is configured to calculate concentrations of the iron ions and the heavy metal ions in the amine absorbing solution after contact with the gas to be treated or after regeneration, and wherein the analysis apparatus comprises:

a collecting unit that is connected to the flow path and that is configured to collect a certain amount of the amine absorbing solution having absorbed the acidic gas from the flow path;

a solution adjusting unit that is connected to the collecting unit and that is configured to adjust a pH value of an amine absorbing solution having absorbed the acidic gas, the amine absorbing solution having been collected, to a predetermined range by adding a pH adjuster to the amine absorbing solution having been collected;

an adsorbing unit that is connected to the solution adjusting unit and that includes a chelating resin, and is configured to pass the amine absorbing solution of which the pH value has been adjusted through the chelating resin in the solution adjusting unit, and thereby allow the chelating resin to adsorb the iron ions and the heavy metal ions in the amine absorbing solution;

a desorbing unit that is connected to the solution adjusting unit and that is configured to pass an acidic regenerating solution through the chelating resin that has adsorbed the iron ions and the heavy metal ions, so as to thereby allow the iron ions and the heavy metal ions to desorb, regenerate the chelating resin, and at the same time, to obtain a sample for measurement, which contains the iron ions and the heavy metal ions; and a measuring unit that is connected to the desorbing unit and that is configured to quantify the iron ions and the heavy metal ions in the sample sent from the desorbing unit for measurement, and to calculate the concentrations of the iron ions and the heavy metal ions in the collected amine absorbing solution, from the quantification results, wherein the analysis apparatus is configured to calculate the concentrations of the iron ions and the heavy metal ions in the collected amine absorbing solution, according to the following formulae (I) and (II):

$$Y = B/(A/C) \quad (\text{I})$$

$$Z = Y \times D/E \quad (\text{II})$$

wherein Y is a concentration (mg/L) of one of the iron ions and the heavy metal ions in the sample for measurement, A is an absorbance (Abs.) of a reference sample, B is the absorbance (Abs.) of the sample for measurement, C is a concentration (mg/L) of one of the iron ions and the heavy metal ions in the reference sample, Z is a concentration (mg/L) of one of the iron ions and the heavy metal ions in the collected amine absorbing solution, D is a volume (L) of a container for quantifying the collected amine absorbing solution, and E is an amount (L) of the collected amine absorbing solution.

8. The system for recovering the acidic gas according to claim 7, wherein the measuring unit includes an absorptiometer that quantifies the iron ions and the heavy metal ions in the sample.

9. The system for recovering the acidic gas according to claim 7, further comprising an apparatus that is connected to the absorbing tower and the regenerating tower, and that is configured to remove the iron ions and the heavy metal ions in the amine absorbing solution calculated by the analysis apparatus when concentrations of the iron ions and the heavy metal ions calculated by the analysis apparatus in the amine absorbing solution have exceeded thresholds, and to send an amine absorbing solution from which the iron ions and the heavy metal ions have been removed to the absorbing tower.

10. The system for recovering the acidic gas according to claim 7, further comprising a control apparatus that is connected so as to be capable of communicating with the analysis apparatus in order to send a signal for cleaning equipment and a flow path of the analysis apparatus when the concentrations of the iron ions and the heavy metal ions in the amine absorbing solution calculated by the analysis apparatus are at predetermined thresholds or lower.

11. The system for recovering the acidic gas according to claim 10, wherein the control apparatus is configured to calibrate an absorptiometer in the cleaned equipment and flow path of the analysis apparatus, or is configured to regenerate the chelating resin.

12. The system for recovering the acidic gas according to claim 11, wherein the measuring unit is configured to separately calculate the concentration of the iron ions and the concentration of the heavy metal ions in the collected amine absorbing solution, and is configured to calculate the concentration of one of the iron ions and the heavy metal ions, have the absorptiometer among equipment and the flow path of the analysis apparatus which have been cleaned by the control apparatus, and then calculate the other of the iron ions and the heavy metal ions.

\* \* \* \* \*